PEAK LIMITING FOR SINGLE SIDEBAND TRANSMITTER

Filed Nov. 1, 1955 2 Sheets-Sheet 1

CODE

| FIG. 1a | FIG. 1b |
| --- | --- |

INVENTOR.
WALTER LYONS
BY
ATTORNEY

PEAK LIMITING FOR SINGLE SIDEBAND TRANSMITTER

Filed Nov. 1, 1955 2 Sheets-Sheet 2

INVENTOR.
WALTER LYONS
BY
F. A. Rechif
ATTORNEY

United States Patent Office 2,811,694
Patented Oct. 29, 1957

2,811,694

PEAK LIMITING FOR SINGLE SIDEBAND TRANSMITTER

Walter Lyons, Flushing, N. Y., assignor to Radio Corporation of America, a corporation of Delaware Application November 1, 1955, Serial No. 544,191

13 Claims. (Cl. 332—38)

Figure 1A:
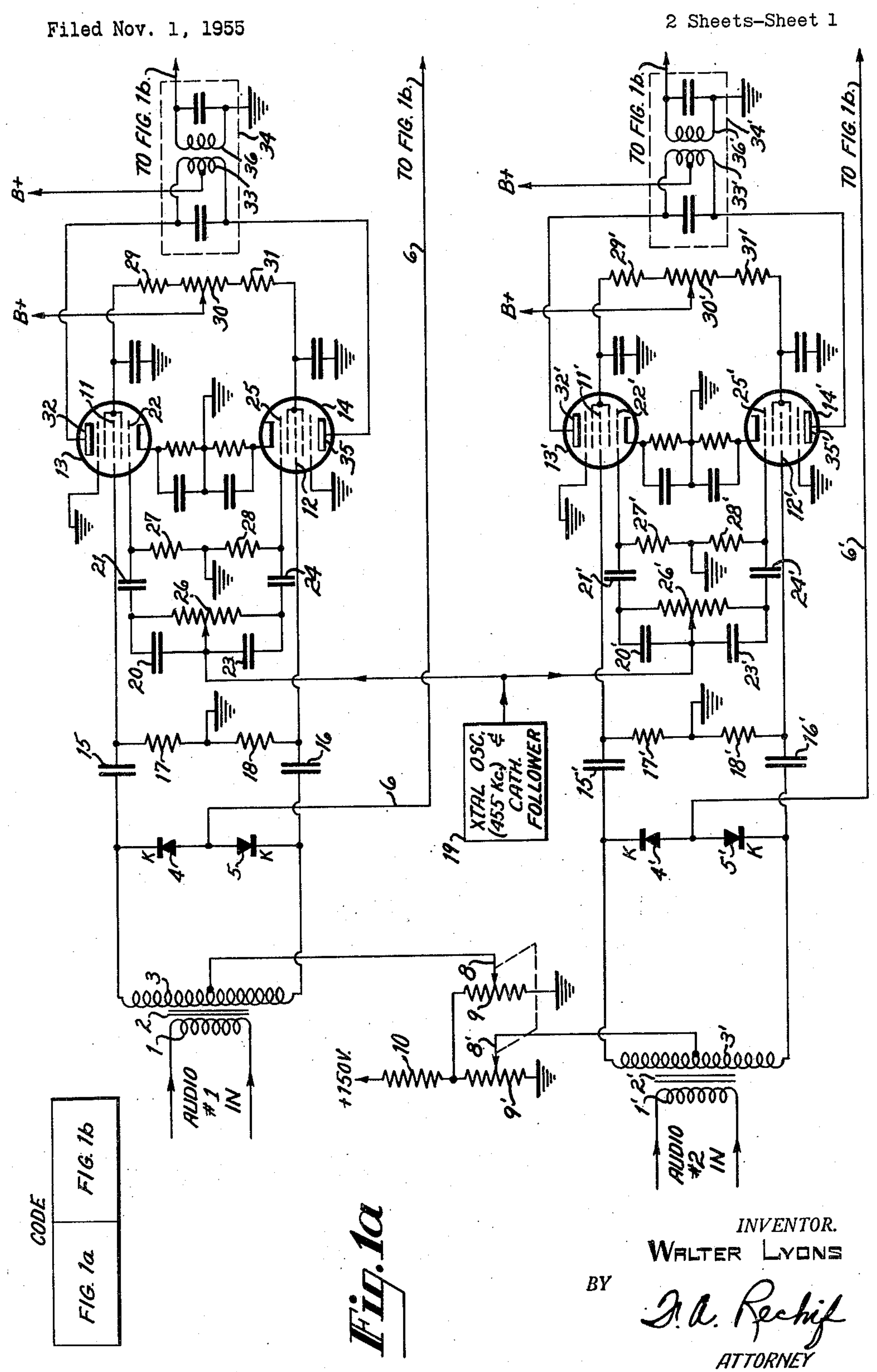

This invention relates to a peak limiting arrangement, particularly useful in single sideband transmitters.

For a single sideband (SSB) signal, the modulation peaks (peaks of the modulating waves or input waves) do not necessarily occur at the same time as the peaks of the modulated radio frequency (R. F.) wave which constitutes the SSB signal. This is due to the phase modulation component of the SSB signal and is the case even though only one input wave or tone is applied to the SSB transmitter. If more than one input tone frequency is applied to the transmitter, the tones may instantaneously have such phases as to add, thereby producing a tremendous peak in the modulated R. F. wave. As an example, for a particular configuration of four frequencies, the peak amplitude may be approximately 2½ times the average, which is equivalent to a ratio of peak envelope power to average power in the transmitter of over six to one. This is an undesirably high ratio which will overload the transmitter or cause distortion in the output signal.

Transmitters have a maximum power output capability which is ordinarily determined by the heat dissipation in the anode circuits of the power amplifier tubes and by the voltage that the transmitter components will withstand. The desideratum is to operate the transmitter at its maximum power output at all times; however, with modulating signals of a practical type this is impossible since such signals are constantly varying in amplitude. Therefore, care must be taken that the peaks of the modulated R. F. wave which is being transmitted do not cause the transmitter to be driven beyond its maximum power output capabilities. For maximum efficiency, then, the ratio of the peak envelope power to the average transmitter power should be kept as low as possible, the minimum ratio being of course unity, and anything that can be done to decrease this ratio toward unity will in effect raise or increase the average power of the transmitter and allow more effective utilization of the capabilities of the transmitter.

Simple clipping of the input audio (modulating wave) level, in an attempt to reduce the peaks, is unsatisfactory in an SSB transmitter since, as previously stated, the modulation peaks (which would be clipped by a simple clipper of this type) do not occur at the same time as the peaks of the modulated R. F. wave (which is the signal effective on the transmitter power amplifier and which determines the peak envelope power and the average power of the transmitter).

An object of this invention is to devise a novel arrangement for reducing the ratio of the peak to the average power transmitted by an SSB transmitter.

Another object is to provide an arrangement for reducing the ratio of the peak to the average power transmitted by an SSB transmitter, while yet allowing any desired configuration or relation of input tone frequencies.

A further object is to devise an arrangement for reducing the ratio of the peak to the average power transmitted by a dual channel SSB transmitter, a transmitter in which upper and lower sidebands each derived in SSB transmission fashion from a different channel carrying different intelligence, are utilized.

In addition to the foregoing, there is another good reason for reducing the peaks transmitted by an SSB transmitter. In a certain type of SSB transmitter exemplified by Kahn Patent 2,666,133, dated January 12, 1954, the SSB signal is separated into its amplitude modulation and phase modulation components and the amplitude modulation component is detected to derive the original modulating wave, following which (after amplification in two separate channels) the modulating wave remodulates the amplified phase modulation component, resulting in an amplified copy of the original SSB wave. In such an arrangement, the peaks of the SSB signal (which is separated into its two components in the transmitter proper) must be kept at a value such that the peak envelope power rating of the transmitter will not be exceeded; if the peak power rating is exceeded, distortion components will be generated which will cause interference outside of the assigned frequency band. The arrangement of the present invention will in effect clip the SSB peaks so as to prevent any of this interference in adjacent channels. Thus, this invention enables utilization of the full power rating of the SSB transmitter under conditions where otherwise the high peak factor in the input signal might limit the user to a lower effective output power.

In a system according to this invention, there is utilized a low level SSB generator in which upper and lower sidebands, derived in SSB fashion from different channels carrying different intelligence, are combined to provide a dual channel SSB signal. In this generator, one or more controllable attenuating devices (e. g., biased diodes) are arranged in shunt in the signal coupling between each modulating wave source and the respective sideband-producing modulator. The combined (dual channel) SSB signal is applied to means (e. g., an amplitude modulation detector) which produces a voltage proportional to the instantaneous modulation peak of such combined SSB signal, and this voltage is applied as a control voltage to the attenuating devices in such a way that they conduct, to attenuate each modulating wave or input signal, when the voltage produced rises to a value equal to the bias applied to the diodes.

Figure 1B:
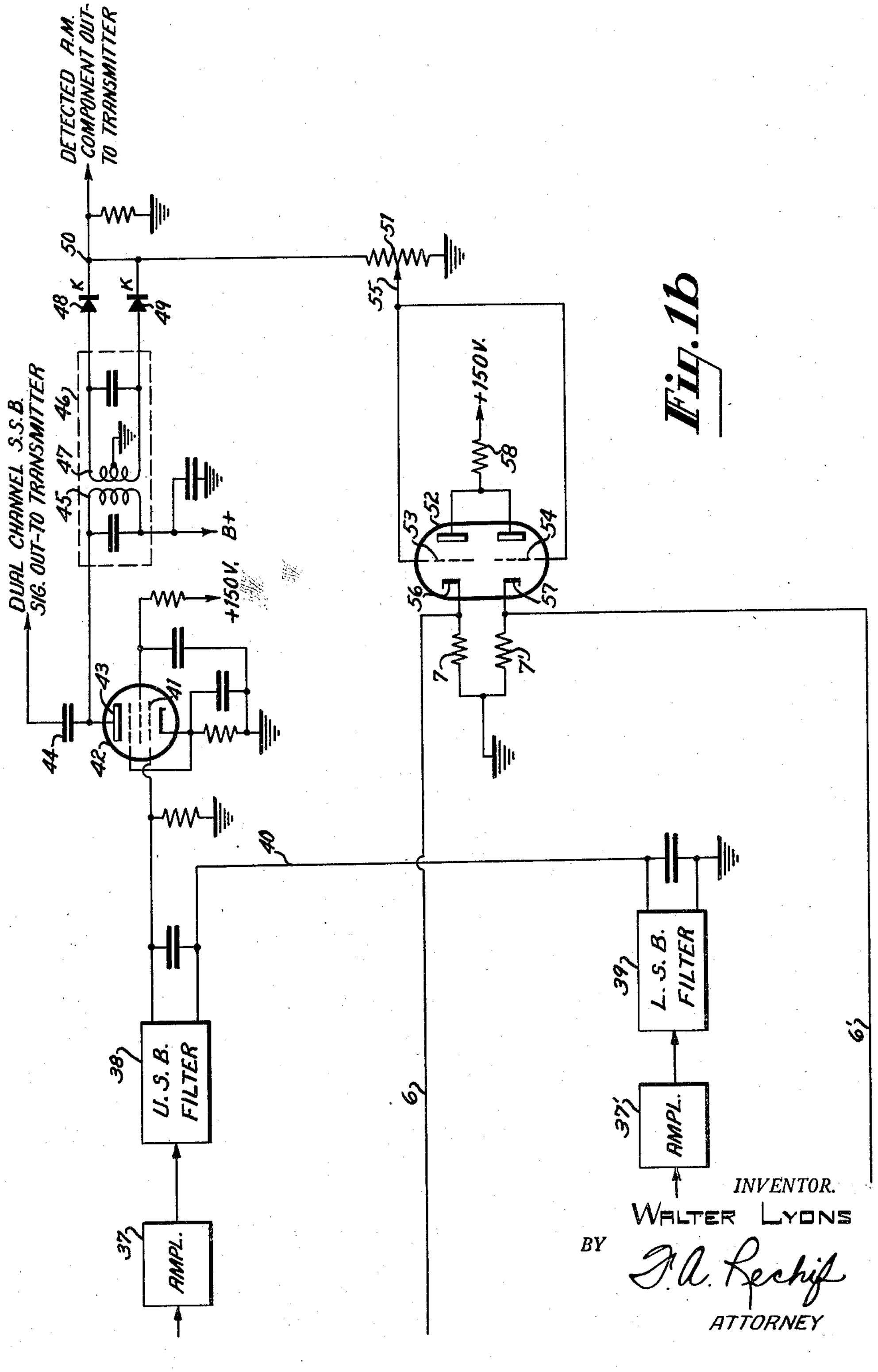

A detailed description of the invention follows, taken in conjunction with the accompanying drawings, wherein Figs. 1*a* and 1*b* together constitute a schematic illustration, partly in block diagram form and partly in detailed circuit form, of an embodiment of the present invention.

The drawing illustrates the present invention used in conjunction with a low level SSB generator of the so-called dual channel type, that is, one in which the upper sideband and the lower sideband carry separate intelligence. Since each of these intelligences is carried by only one sideband, the generator may be termed an SSB generator. The low level SSB generator of the drawings may be used, for example, as the SSB generator in the transmitter illustrated in the aforementioned Kahn patent.

The two channels of the dual channel SSB generator are substantially similar to each other, and for convenience only one of these will be described in detail. Components in the second channel similar to those in the first channel are denoted by the same reference numerals, but with prime designations. Audio signal No. 1 is fed to the primary winding 1 of an audio input transformer 2 having a centertapped secondary winding 3. The audio input signal to the SSB generator may be voice signals, or it may be one or more different audio tones each of which is shifted in frequency in accordance with intelligence in the form of a telegraphic code. The cathode of a diode 4 is connected to one end of secondary winding 3, while the cathode of a diode 5 is connected to the other end of winding 3. For each diode used in the arrangement of this invention, the symbol K denotes the cathode. The opposite electrodes (i. e., the anodes) of diodes 4 and 5 are connected together and to a lead 6 which supplies a controllable bias voltage to the anodes of diodes 4 and 5. A connection extends from lead 6 through a resistor 7 to ground, so that when diodes 4 and 5 are so biased as to present a low resistance (in a manner to be described hereinafter), the audio input signal appearing across transformer 2 is shunted across winding 3, or effectively attenuated in passing to modulator tubes 13, 14 by means of diode 4 and diode 5. The diodes 4 and 5 may therefore be termed controllable attenuating devices in the audio input signal coupling.

For biasing the diodes 4 and 5 such that they do not conduct or present a low resistance at all times, a small positive voltage (with respect to ground) is applied to the cathodes thereof by way of the centertap on winding 3. This voltage is derived from the movable arm 8 on a potentiometer 9 one end of which is connected through a resistor 10 to +150 volts and the other end of which is grounded. Arm 8 is connected to the centertap on winding 3.

Audio signal No. 2 is fed to the primary winding 1' of transformer 2'. The cathodes of diodes 4' and 5' are connected to respective opposite ends of secondary winding 3', and the anodes of these diodes are connected together and to lead 6' and through this lead and resistor 7' to ground. Potentiometer 9' is connected in parallel with potentiometer 9, and the movable arm 8' on potentiometer 9' is mechanically ganged with arm 8 (as indicated by the dotted line connection between them) and is electrically connected to the centertap on winding 3'.

When diodes 4' and 5' are so biased as to present a low resistance, the audio input signal appearing across transformer 2' is shunted across winding 3', or effectively attenuated in passing to modulator tubes 13', 14', by means of diode 4' and diode 5'.

The audio input signal appearing in secondary winding 3 (if unattenuated to any appreciable extent by diodes 4 and 5) is applied to the No. 3 grids 11 and 12, respectively, of a pair of pentagrid vacuum tubes 13 and 14 connected as a balanced modulator. The connection from one end of the winding 3 to grid 11 is made through a D. C. blocking capacitor 15 of large capacitance value, while the connection from the other end of winding 3 to grid 12 is made through a similar D. C. blocking capacitor 16 of large capacitance value. Leak resistors 17 and 18, respectively, are provided for capacitors 15 and 16.

Carrier wave energy (for example, of 455 kc. frequency) is supplied to the balanced modulator 13, 14 from a crystal oscillator and cathode follower unit 19, this connection being made through capacitors 20 and 21 to No. 1 grid 22 of tube 13 and through capacitors 23 and 24 to No. 1 grid 25 of tube 14. A potentiometer 26 is connected from the common junction of capacitors 20 and 21 to the common junction of capacitors 23 and 24, and the movable arm of this potentiometer is connected to the common junction of capacitors 20 and 23. Leak resistors 27 and 28, respectively, are provided for capacitors 21 and 24. The No. 2 grid and the No. 4 grid of tube 13 are connected together internally and to the positive terminal B+ of a unidirectional potential source by way of a resistor 29 and a potentiometer 30, while the No. 2 grid and the No. 4 grid of tube 14 are connected together internally and to the positive terminal B+ by way of a resistor 31 and the potentiometer 30. The cathodes of tubes 13 and 14 are connected each through a separate resistance-capacitance self-biasing network to ground.

The output connections of the balanced modulator described comprise a connection from anode 32 of tube 13 to one end of the tuned primary winding 33 of an output transformer 34, and a connection from anode 35 of tube 14 to the other end of winding 33. Thus, the balanced modulator 13, 14 has a push-pull output connection.

Mixing of the carrier wave and audio energies occurs in the modulator 13, 14, and the upper and lower sidebands appear in the primary winding 33, from whence they are coupled by secondary winding 36 of transformer 34 to the input of an amplifier 37. An upper sideband filter 38 is coupled to the output of amplifier 37 to select out and pass, from this output, only the upper sideband. The output of filter 38 is thus a SSB (the upper sideband) signal representative of audio signal No. 1. The balanced modulator 13', 14' (in the other of the two channels) is connected similarly to balanced modulator 13, 14, and is similarly supplied with carrier wave energy (from unit 19) and with audio energy (from audio signal input No. 2). Mixing of the carrier wave and audio energies occurs in the modulator 13', 14', and the upper and lower sidebands appear in the primary winding 33', from whence they are coupled by secondary winding 36' of transformer 34' to the input of amplifier 37'. A lower sideband filter 39 is coupled to the output of amplifier 37' to select out and pass, from this output, only the lower sideband. The output of filter 39 is thus an SSB (the lower sideband) signal representative of audio signal No. 2.

The output of filter 38 (upper sideband) and the output of filter 39 (lower sideband) are combined or added together, as indicated by lead 40 coupling these filter outputs, and the combined output is fed to the control grid 41 of a pentode vacuum tube 42 connected as a common amplifier for both of the SSB signal channels. A portion of the output of amplifier 42 is taken off from the anode 43 of this tube and fed through a coupling capacitor 44 to the main portion of an SSB radio transmitter, such as the transmitter illustrated in the aforementioned Kahn patent. The output of amplifier 42 is a so-called dual channel SSB signal, that is, two sideband signals (upper sideband and lower sideband) each carrying separate, different intelligence.

The remaining portion of the output of amplifier 42 is taken off from anode 43 and applied to the tuned primary winding 45 of an output transformer 46 which also has a tuned secondary winding 47. A full-wave rectifier circuit is coupled to secondary winding 47. This latter circuit is constituted by two diodes 48 and 49, the anodes of these diodes being connected to respective opposite ends of winding 47 and the cathodes of these diodes being connected together at point 50. The full-wave rectifier 48, 49 operates to isolate and detect the amplitude modulation component of the SSB signal, the voltage appearing at point 50 varying in the positive direction from a zero axis and corresponding to the envelope of the amplitude modulation component of the SSB signal outputs of filters 38 and 39.

A portion of the amplitude modulation envelope output at point 50 may be utilized as the detected amplitude modulation component for an SSB transmitter of the type illustrated in the aforementioned Kahn patent. In this connection, it will be remembered that in the Kahn transmitter the SSB signal is separated into its amplitude modulation and phase modulation components, these two components then being acted upon separately.

The rectifiers 48 and 49 are so poled as to produce at point 50 a fluctuating unidirectional voltage which is positive-going and the amplitude of which corresponds at all times to, and varies with, the instantaneous modulation peak of the SSB signal in the output of amplifier 42. In other words, the potential at point 50 is proportional at all times to the instantaneous peak of the total amplitude modulation of the transmitter. This potential is unidirectional, is positive-going, and is fluctuating in nature, along with the modulation. An adjustable portion of this fluctuating unidirectional positive-going voltage is taken off from point 50 by means of a potentiometer 51 having a movable arm 55 and connected between point 50 and ground. Such portion is separated into two parts and amplified by means of separate D. C. amplifiers constituted by the two halves of a twin triode vacuum tube 52. Both of the triode grids 53 and 54 are connected to the movable arm 55 of potentiometer 51. Resistor 7 is connected from one triode cathode 56 to ground, and resistor 7′ is connected from the other triode cathode 57 to ground. Lead 6 is connected to the cathode end of resistor 7, and lead 6′ is connected to the cathode end of resistor 7′. The two triode anodes of tube 52 are connected together and through a resistor 58 to the positive terminal of the unidirectional potential source. Thus, the two triode structures of tube 52 serve as separate D. C. amplifiers having cathode outputs.

The voltage applied to grids 53 and 54 is positive with respect to ground and varies with the amplitude modulation peaks. As this positive voltage rises, the voltage at cathodes 56 and 57 also increases, increasing the bias voltage applied by means of lead 6 to the anodes of diodes 4 and 5 and also the bias voltage applied by means of lead 6′ to the anodes of diodes 4′ and 5′.

As previously stated, a positive bias voltage is applied to the cathodes of diodes 4 and 5 by way of potentiometer arm 8, and a positive bias voltage is applied to the cathodes of diodes 4′ and 5′ by way of potentiometer arm 8′. These positive bias voltages on the diode cathodes constitute clipping level potentials, and by adjustment of arms 8 and 8′ such potentials may be varied. These positive voltages on the diode cathodes keep the diodes 4, 5, 4′ and 5′ normally cut off or open-circuited, that is, so that they present extremely high resistances. As the amplitude modulation peak of the SSB signal increases, the positive voltage at point 50 increases, so that the voltage applied by means of leads 6 and 6′ to the anodes of diodes 4, 5, 4′ and 5′ also increases. When this amplitude modulation peak-responsive positive voltage applied to the anodes of the diodes becomes equal to the fixed positive bias voltage applied to the cathodes of the diodes, diodes 4, 5, 4′ and 5′ conduct and become very low in resistance, thereby shunting the input signals across the secondary winding 3, 3′ or effectively highly attenuating the input signals, the audio input signals applied to grids 11 and 12 (for the upper sideband) being shunted through diodes 4 and 5 and those applied to grids 11′ and 12′ (for the lower sideband) being shunted through diodes 4′ and 5′. Essentially, then, what happens may be stated in the following way: if a modulation peak appears in the output of amplifier 42, a peak positive voltage is applied to diodes 4, 5, 4′ and 5′ to turn the same on (cause them to conduct), thereby to peak limit or clip the input modulating waves, by attenuation. In other words, the diodes 4, 5, 4′ and 5′ operate in response to voltages produced at point 50 above a predetermined value (the value set by the "clip level adjustment" 8, 8′) to effectively attenuate the modulating waves (audio input waves) applied from the two modulating wave sources to the two balanced modulators 13, 14 and 13′, 14′. Adjustments of the various potentiometer arms 8, 8′ and 55 are made so that input limiting to the mixer tubes 13, 14, 13′ and 14′ (by means of the diodes or controllable attenuating devices 4, 5, 4′ and 5′) will assure a fixed maximum peak (fixed amplitude modulation peak) at the output of amplifier 42.

For maximum efficacy of operation, the time delay in the circuitry between the controlling and controlled circuits should be considered, and should be kept to a minimum, so that attenuation of the audio input may be brought about as quickly as possible after its manifestation in the modulation peak at the output of the SSB generator. The only appreciable time delay would appear to be that in the sideband filters 38 and 39. In a practical case, the time delay in these filters might be approximately 0.6 ms., so that the corresponding voltage (operative on diodes 4, 5, 4′ and 5′) might then appear at the audio input about 0.6 ms. later than the audio signal producing the modulation peak. However, the transmitter amplifier will be overloaded only for this length of time, which is substantially inappreciable. Alternatively, without too much difficulty, means may be devised for reducing the time delay below 0.6 ms.

What is claimed is:

1. In a single sideband transmitter, a source of modulating waves, a source of carrier waves, means receptive of waves from both of said sources for producing therefrom a single sideband signal in the form of a complex wave, means receptive of said signal for producing a voltage proportional to the instantaneous modulation peak of said signal, and means operating in response only to produced voltages above a predetermined value to effectively shunt the modulating waves applied from said modulating wave source to said first-mentioned means, thereby substantially preventing said modulating waves from reaching said first-mentioned means.

2. A telegraph transmitter as defined in claim 1 wherein said modulating waves are frequency shifted telegraph signals.

3. In a single sideband transmitter, a source of modulating waves, a source of carrier waves, means receptive of waves from both of said sources for producing therefrom a single sideband signal in the form of a complex wave, an amplitude modulation detector receptive of said signal for producing a voltage proportional to the instantaneous amplitude modulation peak of said signal, and means controlled by said voltage for effectively shunting the modulating waves applied from said modulating wave source to said first-mentioned means, but in response only to produced voltages above a predetermined value.

4. In a dual channel single sideband transmitter, two sources of modulating waves, a source of carrier waves, first means receptive of waves from one of said modulating wave sources and from said carrier wave source for producing therefrom a first single sideband signal in the form of a complex wave, second means receptive of waves from the other of said modulating wave sources and from said carrier wave source for producing therefrom a second single sideband signal in the form of a complex wave, means receptive of both of said signals for producing a voltage proportional to the instantaneous sum of the modulation peaks of both signals, and means operating in response only to produced voltages above a predetermined value to effectively shunt the modulating waves applied from said one modulating wave source to said first means and to effectively shunt the modulating waves applied from said other modulating wave source to said second means, thereby substantially preventing said modulating waves from reaching either said first or said second means.

5. In a single sideband transmitter, a source of modulating waves, a source of carrier waves, means for producing from the waves of both of said sources a single sideband signal, signal couplings between said sources and said means, means receptive of said signal for producing a voltage proportional to the instantaneous modulation peak of said signal, a diode shunting the signal coupling between said modulating wave source and said first-mentioned means, and means for applying said produced voltage to said diode as a bias voltage therefor.

6. In a dual channel single sideband transmitter, two sources of modulating waves, a source of carrier waves, first means receptive of waves from one of said modulating wave sources and from said carrier wave source for producing therefrom a single sideband signal, second means receptive of waves from the other of said modulating wave sources and from said carrier wave source for producing therefrom a second single sideband signal, means receptive of both of said signals for producing a voltage proportional to the instantaneous sum of the modulation peaks of both signals, a controllable shunting device in the coupling between said one modulating wave source and said first means, a controllable shunting device in the coupling between said other modulating wave source and said second means, and means for applying said produced voltage to both of said devices as a control voltage therefor.

7. In a dual channel single sideband transmitter, two sources of modulating waves, a source of carrier waves, first means for producing from the waves of one of said two sources and of said carrier wave source a first single sideband signal, second means for producing from the waves of the other of said two sources and of said carrier wave source a second single sideband signal, means receptive of both of said signals for producing a voltage proportional to the instantaneous sum of the modulation peaks of both signals, at least one diode shunting the signal coupling between said one modulating wave source and said first means, at least one diode shunting the signal coupling between said other modulating wave source and said second means, and means for applying said produced voltage to both of said diodes as a bias voltage therefor.

8. In a single sideband transmitter, a source of modulating waves, a source of carrier waves, means for producing from the waves of both of said sources a single sideband signal, signal couplings between said sources and said means, means receptive of said signal for producing a voltage proportional to the instantaneous modulation peak of said signal, a diode shunting the signal coupling between said modulating wave source and said first-mentioned means, means for applying an adjustable unidirectional voltage to said diode as a bias voltage therefor, and means for applying said produced voltage to said diode as a bias voltage therefor.

9. In a single sideband transmitter, a source of modulating waves, a source of carrier waves, a balanced modulator, a signal coupling for applying waves from said modulating wave source to said modulator, means for applying waves from said carrier wave source to said modulator, a single sideband filter coupled to the output of said modulator, means receptive of the single sideband signal output of said filter for producing a voltage proportional to the instantaneous modulation peak of said signal, and means operating in response only to produced voltages above a predetermined value to effectively shunt the modulating waves in said signal coupling, thereby substantially preventing said modulating waves from reaching said modulator.

10. In a single sideband transmitter, a source of modulating waves, a source of carrier waves, a balanced modulator, a signal coupling for applying waves from said modulating wave source to said modulator, means for applying waves from said carrier wave source to said modulator, a single sideband filter coupled to the output of said modulator, an amplitude modulation detector receptive of the single sideband signal output of said filter for producing a voltage proportional to the instantaneous amplitude modulation peak of said signal, and means controlled by said voltage for effectively shunting the modulating waves in said signal coupling, but in response only to produced voltages above a predetermined value.

11. In a dual channel single sideband transmitter, two sources of modulating waves, a source of carrier waves, a first balanced modulator, a first signal coupling for applying waves from said modulating wave source to said modulator, means for applying waves from said carrier wave source to said modulator, a single sideband filter coupled to the output of said modulator, a second balanced modulator, a second signal coupling for applying waves from said modulating wave source to said second modulator, means for applying waves from said carrier wave source to said second modulator, a single sideband filter coupled to the output of said second modulator, means receptive of the single sideband signal outputs of both of said filters for producing a voltage proportional to the instantaneous sum of the modulation peaks of both signals, and means operating in response only to produced voltages above a predetermined value to effectively shunt the modulating waves in both of said signal couplings, thereby substantially preventing said modulating waves from reaching either said first or said second modulators.

12. In a dual channel single sideband transmitter, two sources of modulating waves, a source of carrier waves, a first balanced modulator, a first signal coupling for applying waves from said modulating wave source to said modulator, means for applying waves from said carrier wave source to said modulator, a single sideband filter coupled to the output of said modulator, a second balanced modulator, a second signal coupling for applying waves from said modulating wave source to said second modulator, means for applying waves from said carrier wave source to said second modulator, a single sideband filter coupled to the output of said second modulator, means receptive of the single sideband signal outputs of both of said filters for producing a voltage proportional to the instantaneous sum of the modulation peaks of both signals, at least one diode shunting said first signal coupling, at least one diode shunting said second signal coupling, and means for applying said produced voltage to both of said diodes as a bias voltage therefor.

13. A telegraph transmitter as defined in claim 12 wherein said modulating waves from said first two sources are frequency shifted telegraph signals having different audio frequencies.

References Cited in the file of this patent

UNITED STATES PATENTS

| | | |
|---|---|---|
| 1,685,357 | Griggs | Sept. 25, 1928 |
| 2,186,958 | Collins | Jan. 16, 1940 |
| 2,214,573 | Booth | Sept. 10, 1940 |